Patented July 30, 1935

2,009,956

UNITED STATES PATENT OFFICE 2,009,956

EXTRACTING IODINE FROM NATURAL BRINES

Leonard C. Chamberlain and Ray H. Boundy, Midland, Mich., assignors to The Dow Chemical Company, Midland, Mich., a corporation of Michigan No Drawing. Application March 22, 1933, Serial No. 662,088

8 Claims. (Cl. 23—217)

The present invention relates to methods for extracting iodine from natural iodiferous brines and the like, and is particularly concerned with what is known as a "wet charcoal" process. Such last mentioned process, briefly, consists in liberating the iodine in the brine and then bringing the brine into contact with active carbon or charcoal on which the free iodine is adsorbed and thus extracted from the brine.

The liberation of iodine in the brine is accomplished by oxidizing the acidified brine with an agent, such as chlorine, chromates, nitrites, etc. For practical purposes chlorine is generally preferred, since it is the most active of the available agents and has the further advantage that it is effective at a lower acidity of the solution than the weaker oxidizers. In the aforementioned wet charcoal process, the acidified and oxidized brine solution, containing the free iodine, is then treated directly with active charcoal in a manner to secure intimate contact of charcoal and solution, and hence an effective adsorption of the iodine on the charcoal.

In working with the process, using chlorine as the oxidizing agent, we found that a high degree of recovery of iodine could be had from synthetically prepared iodide solutions containing as low as 40 parts per million of iodine. When it was attempted to apply the same process to extracting iodine from natural brines, however, the yields fell far short of those attainable with synthetic iodide solutions. We discovered that the cause of the wide discrepancy between the yields obtainable in the two cases lay in the concentration of chlorides in the natural brine. We found that, when a solution containing free iodine, but no chlorides, is contacted with active charcoal, the iodine may be substantially completely adsorbed on the charcoal. However, when the iodine-containing solution has a substantial content of chlorides, as is the case with natural brines, the presence of the chlorides causes the charcoal to act as a reducing agent to reduce iodine to iodide, so that a portion of the free iodine present in the brine is reduced to iodide again and remains in solution, while only the unreduced portion is actually adsorbed on the charcoal and can be recovered therefrom. The presence of other salts, such as sulphates, carbonates, etc., does not have the same effect as that of chlorides to cause reduction of the iodine by the charcoal.

To prevent such reducing action of the charcoal in the presence of chlorides the apparent solution of the problem would be to use an excess of the oxidizing agent to offset or counteract the reducing effect of the charcoal. In the case of chlorine, however, we have found that such procedure is quite ineffectual, inasmuch as the excess of chlorine is rapidly reduced to hydrogen chloride by the active charcoal in the presence of water, in fact, much more rapidly than the iodine is reduced. Accordingly, the use of an excess of chlorine affords practically no protection to the iodine against reduction by the charcoal. Similarly, other strong oxidizers, such as bromine, chromic acid, etc., which are more rapidly reduced by active charcoal than is iodine, are incapable of sufficiently protecting the free iodine from reduction when the brine containing the same is contacted with active charcoal.

We have found, however, that by adding nitrous acid or a nitrite to the solution in which the iodine has been liberated, the reduction of the iodine may be practically prevented, when the solution is subsequently contacted with active charcoal. The following description sets forth in detail the improved procedure constituting our invention.

The relative strength of the oxidizing agents here in question may be seen by reference to the accompanying table showing the values for the oxidation potential of the respective agents, as we have determined them electrometrically.

|  | Volt |
|---|---|
| Iodine | .54 |
| Nitrous acid, $p^H=3$ | .50 |
| Nitrous acid, $p^H=1.2$ | .60 |
| Potassium dichromate | .89 |
| Bromine | .97 |
| Chlorine | 1.20 |

The values given show the potential of the several oxidizing agents in dilute solution and in absence of reduced ions of the agent. Nitrous acid is seen to have about the same or slightly higher oxidation potential than iodine, the exact value varying with the degree of acidity. On the other hand, the stronger oxidizers have a materially higher oxidation potential. When a solution of one of the agents is contacted with active charcoal, the latter acts to reduce the oxidizing agent, such action being the more rapid the stronger the agent. In the case of chlorine reduction takes place almost at once, and also quite rapidly with bromine and chromic acid. It is relatively slow with nitrous acid, particularly at low degree of acidity, e. g. a $p^H$ value between 2 and 3, and still slower with iodine. In fact, iodine is hardly reduced at all at ordinary temperatures, except in the presence of an appreciable concentration of chlorides which promotes the reduction.

The liberation of iodine from an iodide solution by chlorinating takes place quickly and completely at an acidity corresponding to a $p^H$ value of approximately 2 to 4, whereas at this degree of acidity nitrous acid liberates iodine slowly and incompletely. If the solution has an appreciable concentration of chlorides, the iodine will be gradually reduced when brought in contact with active charcoal, even if an excess of a strong oxidizer like chlorine is present, the strong oxidizer being so rapidly reduced as to afford no protection for the iodine. We have found, however, that the addition of a small amount of nitrous acid to the chloride solution containing free iodine, at a $p^H$ value between about 2 and 4, will substantially prevent reduction of the iodine when the solution is contacted with active charcoal for adsorbing the iodine thereon. This is apparently at the expense of the nitrous acid, which is gradually reduced by the charcoal in preference to the iodine, but so slowly that in the time required to adsorb the iodine on the charcoal the amount of nitrous acid reduced is less than the chemical equivalent of the small amount of iodine ordinarily present in natural brines. At any rate, the practical result is that the presence of nitrous acid prevents the reduction of iodine by the charcoal in the presence of chlorides, and thus permits a practically quantitative adsorption of iodine on the charcoal.

Our invention has particular applicability to the extraction of iodine from natural brines, which in most cases are derived from oil fields. Typical oil field brines containing iodine have a chloride content, figured as NaCl, of about 3 to 5 per cent, or sometimes more. When the iodine is liberated in such a brine by chlorinating, even when an excess of chlorine is used, and the solution then contacted with active charcoal to adsorb the iodine thereon, from about 10 to 40 per cent of the iodine may be reduced again to soluble iodide, and thus escape adsorption on the charcoal. Such loss is prevented by proceeding according to our invention, in which nitrous acid or a nitrite is added to the solution of free iodine prior to contacting the same with adsorbent charcoal. The proportion of nitrous acid or nitrite added may vary considerably, provided a sufficient quantity is used. In general the chemical equivalent of the free iodine present is ample to prevent reduction of iodine, while in practice we have found that about ¼ of the chemical equivalent may actually suffice for the purpose.

As an example of the operation of the invention, a natural brine containing 3 per cent of NaCl and 40 parts per million of iodine was acidified to $p^H=2$, chlorinated until all of the combined iodine was liberated, as shown by oxidation potential of .54 volt, and then contacted with a body of active charcoal to adsorb the free iodine. The liquor finally separated from the charcoal, upon analysis, was found to contain 34.6 per cent of the original iodine content in reduced form as iodide. Upon repeating the experiment with addition of 70 parts per million of sodium nitrite to the iodine solution prior to contacting the same with the charcoal, analysis of the final liquor showed no iodide present therein. Hence, none of the liberated iodine had been reduced again to iodide by action of the charcoal. Similar results were obtained, using smaller amounts of sodium nitrite, e. g. as low as 6 parts per million thereof, corresponding to ¼ of the chemical equivalent of the iodine present.

In a commercial process for obtaining iodine from natural brines, such as oil-field brines, which incorporates the herein-described improvement, we first acidify the brine, which has previously been clarified or filtered if necessary, such acidification being preferably to a $p^H$ value between 2 and 4; the acidified brine is chlorinated to liberate iodine, employing chlorine preferably in amount not greatly exceeding the theoretical equivalent of the iodine in the brine; then to the chlorinated brine is added from about ¼ to 1 chemical equivalent of a soluble nitrite, e. g. sodium nitrite; the solution is intimately contacted with a body of active carbon or charcoal to adsorb the iodine thereon; and the iodine-saturated charcoal is separated and washed. The iodine-saturated charcoal is treated by any of the known methods for recovering the iodine therefrom, for instance, by heating with an aqueous alkali, whereby the iodine is extracted as iodide. The treated charcoal is washed free from salts, and may then be reused for adsorbing a further quantity of iodine. By proceeding in the foregoing manner we are enabled to recover iodine in high yield from natural brines and the like by a wet-charcoal method, despite the presence of a considerable concentration of chlorides in the brine, which has defeated previous attempts to produce iodine in satisfactory yield from natural brines by such method.

For purposes of the present invention any form of activated carbon capable of adsorbing iodine may be employed as a substantial equivalent of charcoal and in the claims the term "active charcoal" is understood to include such equivalent forms of activated carbon, whether prepared from wood or shell chars, from coal, or in any other way.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method of producing iodine from iodiferous brines containing a high proportion of chloride relative to iodide which comprises acidifying the brine, chlorinating to liberate iodine therein, adding a nitrite to the solution, contacting the latter with a body of active charcoal to adsorb iodine thereon and separating the iodine-charged charcoal.

2. The method of producing iodine from iodiferous brines containing a high proportion of chloride relative to iodide which comprises acidifying to a $p^H$ value between 2 and 4, chlorinating to liberate iodine, adding a nitrite to the solution, contacting the latter with a body of active charcoal to adsorb iodine thereon and separating the iodine-charged charcoal.

3. The method of producing iodine from iodiferous brines containing a high proportion of chloride relative to iodide which comprises acidifying to a $p^H$ value between 2 and 4, chlorinating to liberate the iodine present, adding a nitrite in amount not exceeding the chemical equivalent of the iodine, contacting the solution with a body of active charcoal to adsorb iodine thereon and separating the iodine-charged charcoal.

4. In a method wherein iodine is liberated in an acidified brine containing a high proportion of chloride relative to iodide by chlorinating and removed therefrom by contacting with active charcoal, the step which consists in adding nitrous acid to the solution containing the free iodine before the same is contacted with the charcoal.

5. In a method of recovering iodine from natural brines containing a high proportion of chloride relative to iodide and the like, the steps which consist in liberating the iodine therein by chlorination, adding nitrous acid and removing the free iodine by adsorbing on active charcoal.

6. In a method wherein iodine is liberated in an acidified brine containing a high proportion of chlorides relative to iodides by chlorinating and removed therefrom by contacting with active charcoal, the step which consists in adding a nitrite to the acid solution containing the free iodine before the same is contacted with the charcoal.

7. In a method wherein iodine is liberated in an acidified brine containing a high proportion of chlorides relative to iodides by chlorinating and removed therefrom by contacting with active charcoal, the step which consists in adding sodium nitrite to the acid solution containing the free iodine before the same is contacted with the charcoal.

8. In a method of recovering iodine from natural brines and the like containing a high proportion of chlorides relative to iodides, the steps which consist in acidifying the brine, liberating the iodine therein by chlorination, adding sodium nitrite and removing the free iodine by adsorbing on active charcoal.

LEONARD C. CHAMBERLAIN.
RAY H. BOUNDY.